US008125665B2

(12) United States Patent
Miyahara

(10) Patent No.: US 8,125,665 B2
(45) Date of Patent: Feb. 28, 2012

(54) IMAGE-PROCESSING SYSTEM, CONTROL METHOD, PROGRAM, AND STORAGE MEDIUM

(75) Inventor: Nobuaki Miyahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 942 days.

(21) Appl. No.: 12/129,586

(22) Filed: May 29, 2008

(65) Prior Publication Data

US 2008/0297822 A1 Dec. 4, 2008

(30) Foreign Application Priority Data

May 31, 2007 (JP) ................................ 2007-145450

(51) Int. Cl.

| | |
|---|---|
| ***G06F 3/12*** | (2006.01) |
| ***G06K 15/00*** | (2006.01) |
| ***H04N 1/29*** | (2006.01) |
| *G03G 15/01* | (2006.01) |

(52) U.S. Cl. ...... 358/1.14; 358/1.13; 358/300; 399/180; 399/364

(58) Field of Classification Search .................. 358/1.1, 358/1.13, 1.14, 1.9, 300, 305; 399/178, 180, 399/197, 364
See application file for complete search history.

(56) References Cited

U.S. PATENT DOCUMENTS

| | | | | |
|---|---|---|---|---|
| 5,604,578 | A * | 2/1997 | Shibuya et al. | 399/178 |
| 6,862,110 | B2 * | 3/2005 | Harrington | 358/1.9 |

FOREIGN PATENT DOCUMENTS

| | | | |
|---|---|---|---|
| DE | 19548907 | A1 | 7/1996 |
| EP | 0892324 | A1 | 1/1999 |
| JP | 2001-305919 | A | 11/2001 |

* cited by examiner

*Primary Examiner* — James A Thompson
(74) *Attorney, Agent, or Firm* — Canon USA, Inc., I.P. Division

(57) ABSTRACT

An image processing system includes a printing unit configured to print an image, a managing unit configured to manage charging information that can be reduced according to print processing performed by the printing unit, and a control unit configured to slow down the print processing performed by the printing unit if an available printing remaining amount indicated by the charging information is less than a predetermined value.

19 Claims, 13 Drawing Sheets

IMAGE-PROCESSING SYSTEM, CONTROL METHOD, PROGRAM, AND STORAGE MEDIUM

BACKGROUND OF THE INVENTION

1. Field of the Invention

The present invention relates to an image-processing system configured to control processing for printing an image according to changing information and also to a control method, a program, and a storage medium therefor.

2. Description of the Related Art

A conventional system includes a charging apparatus, such as a coin vendor or a card vendor, and an image-forming apparatus connected to each other, and manages charging information related to print processing (copying or printing). Such a conventional system is used in the case of providing a printing service to an indefinite number of users at a store (for example, a convenience store) or in an office to manage the number of consumed printing paper sheets for each division.

More specifically, a user who desires to use a copy service, for example, prepays a fee for the desired copy processing via a coin vendor or using a prepaid card or a credit card. After setting various copy parameters (parameters for the number of documents, the number of copies, the paper size, and the color mode (monochromatic/color)), the user instructs printing. Then, the fee corresponding to the amount of prints to be performed according to the set parameters is deducted from the paid fee, and then the print operation starts. If the remaining fee is short of the amount to be charged for the desired printing, the print processing does not start.

Meanwhile, the remaining amount of fee may become short of the required charge during the print processing instructed by a user. For example, in the case where a user has instructed print processing for five pages when the user paid a fee for printing only three pages, the instructed print processing is suspended when the shortage of the paid fee is detected after performing the print processing for three pages. In this regard, Japanese Patent Application Laid-Open No. 2001-305919 discusses the following method for avoiding performing print processing for pages whose fee is yet to be paid or outputting an incompletely-printed product.

The method discussed in Japanese Patent Application Laid-Open No. 2001-305919 prevents, in the case of reading an image on one side of a document and forming an image on both sides of print paper, a number of print products from being output exceeding the number of products for which the fee has been paid, by performing print processing after checking the remaining amount of the paid fee before starting every print paper-feed operation. The method discussed in Japanese Patent Application Laid-Open No. 2001-305919 suspends the feeding of the print paper when the remaining amount of the paid fee is smaller than the charge for printing an image on both sides of the print paper and thus an image can be formed on only one side of the print paper and if an image to be formed on the other side of the print paper still remains.

However, the method discussed in Japanese Patent Application Laid-Open No. 2001-305919 has the following problems. That is, with the method discussed in Japanese Patent Application Laid-Open No. 2001-305919, which checks the remaining amount of the paid fee before starting a print paper-feed operation and starts a print paper-feed operation after determining that the remaining amount of the paid fee is large enough to perform the instructed printing, the print processing cannot be performed at a high speed and thus the printing efficiency may degrade. In particular, in the case where an image-forming function for actually performing print processing and a charging information managing function are provided to respective different apparatuses and where the apparatuses are connected to each other to perform data communication for performing the instructed print processing, a long time may be required to check for the remaining amount of the paid fee. Thus, the printing efficiency may degrade.

On the other hand, print processing can be performed at a speed higher than that in the case of the above-described method by starting a print paper-feed operation and a print operation in parallel to checking the remaining amount of the paid fee, instead of starting a print paper-feed operation after checking the remaining amount of the paid fee. With such a method of starting a print paper-feed operation or a print operation before determining that the remaining amount of the paid fee is large enough to start the instructed processing, the printing efficiency can improve because the length of time required for checking the remaining amount of the paid fee can be appropriately reduced.

However, with such a conventional method, when it is detected that the remaining amount of the paid fee is not large enough to complete the instructed processing and when the image-forming apparatus has received an instruction from the charging apparatus for suspending the current print processing, the image-forming apparatus cannot suspend the already-started print paper-feed operation or print operation. In this case, the fee for the print processing that has been already performed exceeding the already-paid fee cannot be appropriately charged.

As described above, the two conventional methods have advantages and drawbacks. Accordingly, in the case of using only one of the two methods, the print efficiency may degrade or the management of charging may not be appropriately performed.

SUMMARY OF THE INVENTION

The present invention is directed to an image processing system configured to appropriately control processing for performing printing an image based on charging information and to efficiently perform print processing, and also to a control method therefor.

According to an aspect of the present invention, an image processing system includes a printing unit configured to print an image, a managing unit configured to manage charging information including a printing remaining amount for determining an amount of print processing that may be performed on the printing unit, which printing remaining amount can be adjusted according to print processing by the printing unit, and a control unit configured to slow down a rate of print processing performed by the printing unit if the printing remaining amount indicated by the charging information is less than a predetermined value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

DETAILED DESCRIPTION OF THE EMBODIMENTS

Various embodiments of the present invention will now herein be described in detail, by way of example only, with reference to the drawings. It is to be noted that the relative arrangement of the components, the numerical expressions, and numerical values set forth in these embodiments are not intended to limit the scope of the present invention unless it is specifically stated otherwise.

First Embodiment

Figure 1:
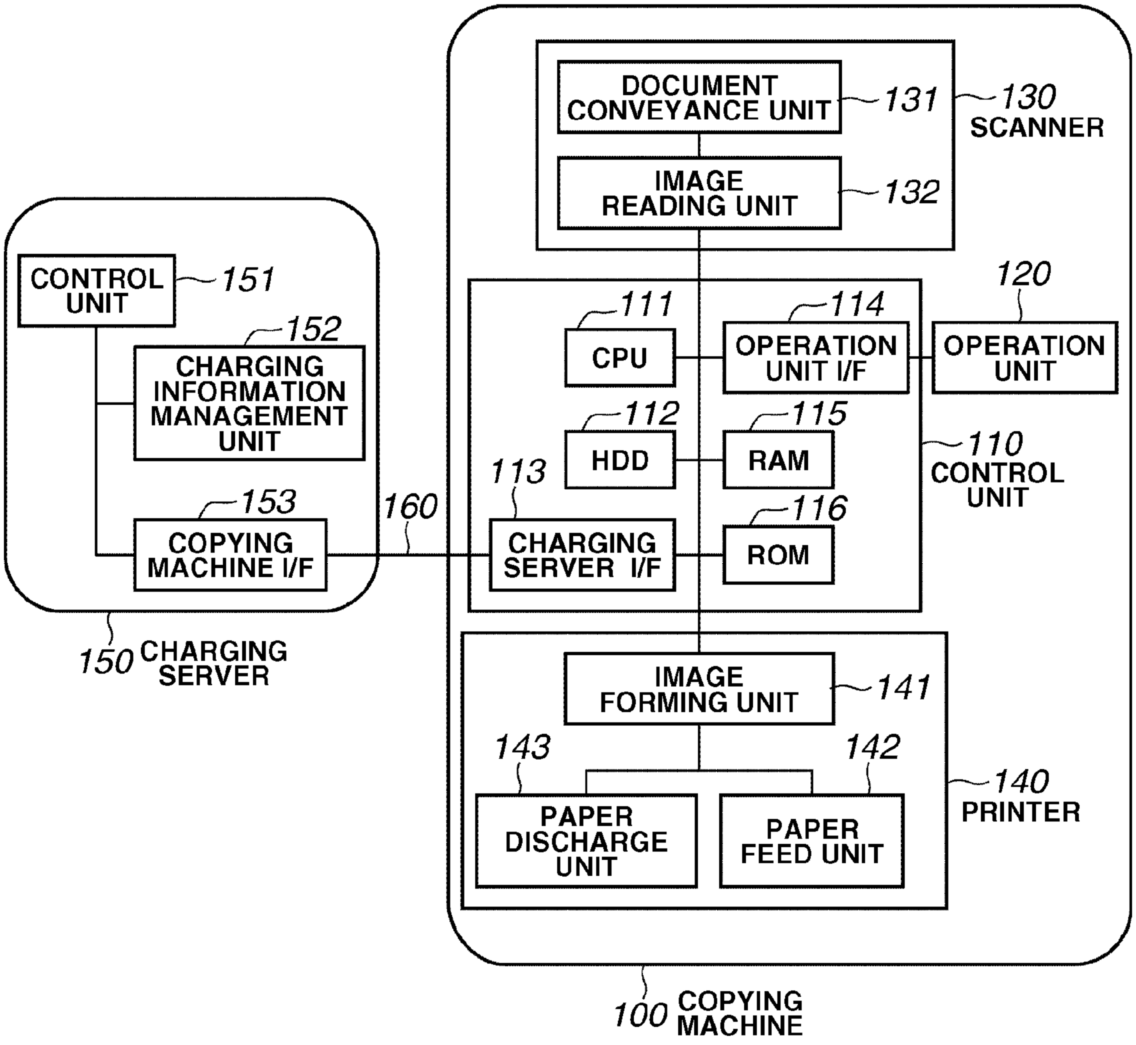
FIG. 1 illustrates the configuration of an image-processing system according to a first embodiment of the present invention.

Now, a first embodiment of the present invention will be described below. FIG. 1 shows the configuration of an image-processing system according to the present embodiment. Referring to FIG. 1, a copying machine (image-forming apparatus) 100 and a charging server (charging apparatus) 150 are in communication with each other via an interface 160. The interface 160 is not limited to a parallel port or a serial port. That is, any form of an interface via which information can be transmitted can be used as the interface 160, such as a universal serial bus (USB) or an Internet protocol (IP) network.

A scanner 130 includes a document-conveyance unit 131 and an image-reading unit 132. The image-reading unit 132 optically reads an image on the document conveyed by the document-conveyance unit 131 and then converts the read document image into image data.

A printer 140 includes an image-forming unit 141, a paper-feed unit 142, and a paper-discharge unit 143. The paper-feed unit 142 can stack a plurality of different types of print papers. The image-forming unit 141 transfers and fixes image data onto the print paper conveyed from the paper-feed unit 142, to print the image data as a visible image. The print paper having the image data is then discharged by the paper-discharge unit 143 out of a body of the copying machine 100.

A control unit 110 is electrically connected to the scanner 130 and the printer 140. The control unit 110 includes a central processing unit (CPU) 111, a hard disk drive (HDD) 112, a charging server interface (I/F) 113, an operation unit I/F 114, a random access memory (RAM) 115, and a read-only memory (ROM) 116.

The CPU 111 activates a system of the copying machine 100 based on a boot program previously stored on the ROM 116. Then, the CPU 111 loads various control programs from the HDD 112 onto the RAM 115, which is a work area for the CPU 111, to perform various processing. The HDD 112 stores image data in addition to the various control programs.

The operation unit I/F 114 is an interface between the control unit 110 and an operation unit 120. The operation unit I/F 114 transfers to the operation unit 120 image data to be displayed on a screen of the operation unit 120 and notifies the CPU 111 of an instruction issued by a user via the operation unit 120. The operation unit 120 includes a liquid crystal panel unit having a function as a touch panel for detecting content of a user instruction based on positional information of a portion on a screen that the user has touched.

The charging server I/F 113 controls data communication between the charging server 150 and the copying machine 100 via the interface 160.

The charging server 150 includes a control unit 151, a charging-information management unit 152, and a copying machine I/F 153. The control unit 151 loads various control programs from a memory (not illustrated) to perform various processing and controls the operation of the charging server 150.

The charging-information management unit 152 manages information about the remaining amount of the fee paid by the user. The charging-information management unit 152 also manages information about the printing fee previously set corresponding to various parameters (parameters for the number of documents, the number of copies, the paper size, and the color mode (monochromatic/color)) related to print processing to be performed by the copying machine 100. The charging information managed by the charging-information management unit 152 can be reduced according to the print processing performed by the copying machine 100.

It is to be noted here that a cash input unit, via which a user drops or puts in cash, and a card-reader unit, via which a user pays the fee using a prepaid card or a credit card, can be provided to either the charging server 150 or another apparatus (not shown) connected to the charging server 150.

The copying machine I/F 153 controls data communication between the copying machine 100 and the charging server 150 via the interface 160.

Figure 2:
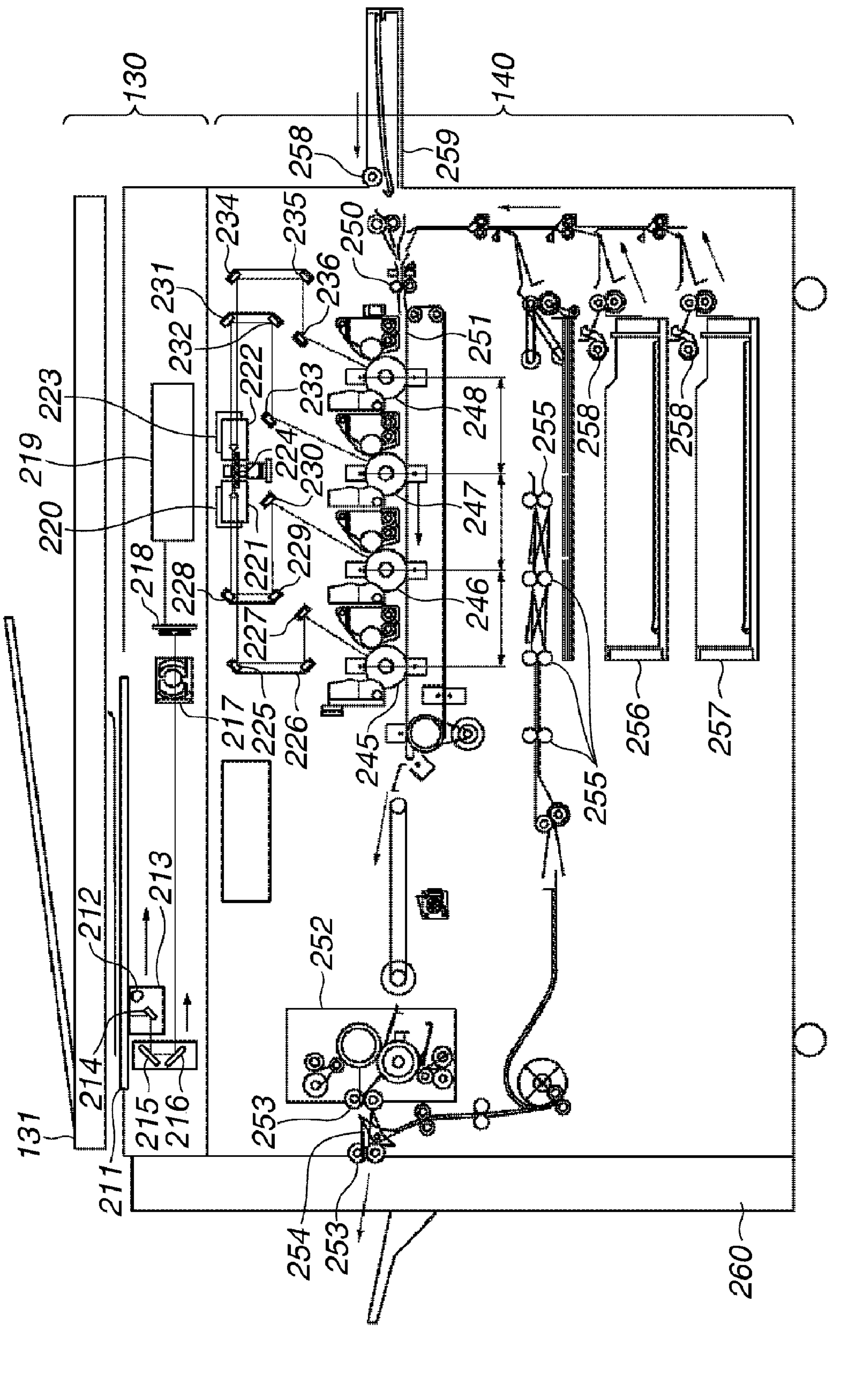
FIG. 2 is a cross-section illustrating the configuration of a copying machine according to the first embodiment of the present invention.

FIG. 2 is a cross-section illustrating an example of a configuration of the copying machine 100, which includes the scanner 130 and the printer 140, according to the present embodiment. Referring to FIG. 2, the document-conveyance unit 131 of the scanner 130 serially coveys sheets of a document one by one, starting with the first sheet, on a platen glass 211. After completely reading the document, the document conveyance unit 131 discharges the document from the platen glass 211. When the document is conveyed on the platen glass 211, a lamp 212 is lit, and an optical unit 213 moves to expose and scan the conveyed document. A light beam reflected from the document is guided to a charge-coupled device (CCD) image sensor 218 via mirrors 214, 215, and 216 and a lens 217.

Image data output from the CCD image sensor 218 is transferred to the control unit 110. An image-processing unit 219 performs processing on image data output from the CCD image sensor 218 and outputs the processed image data as a print signal.

A laser driver 224 of the printer 140 drives each of laser emission units 220, 221, 222, and 223 and allows each of the laser emission units 220, 221, 222, and 223 to emit a laser beam according to the image data out from the control unit 110. The laser beam is irradiated onto a surface of each of photosensitive drums 245, 246, 247, and 248, via mirrors 225 through 236. Then, a latent image is formed on the surface of each of the photosensitive drums 245 through 248 according to the irradiated laser beam.

The print paper fed from either one of paper cassettes 256 and 257 and a manual feed tray 259 is conveyed onto a transfer belt 251 via a registration roller 250. Here, the print paper is fed by a paper-feed roller 258 one by one from either the paper cassettes 256 and 257 or the manual feed tray 259. Furthermore, in the present embodiment, a recording medium other than print paper, such as an overhead projector (OHP) sheet, can be fed and used as a print medium.

The print paper is further conveyed by the transfer belt 251 at a timing in synchronization with the start of irradiation of the laser beam. Then, a developer on the photosensitive drums 245 through 248 is transferred onto the print paper. The print paper having the transferred developer image is then conveyed to a fixing unit 252. The fixing unit 252 applies heat and pressure to the print paper to fix the developer image transferred to the print paper.

The print paper having passed the fixing unit 252 is then discharged to a paper discharge unit 260 by a discharge roller 253. The paper discharge unit 260 performs sorting and bundling of the discharged print paper sheets, and further, staples the sorted and bundled print paper sheets.

In the case where the user has instructed two-sided printing, after the print paper is conveyed to the discharge roller 253, the discharge roller 253 is rotated in a reverse direction to guide the print paper into a paper re-feed conveyance path 255 by a flapper (diverter) 254. The print paper guided into the paper re-feed conveyance path 255 is again conveyed by the transfer belt 251.

Figure 3:
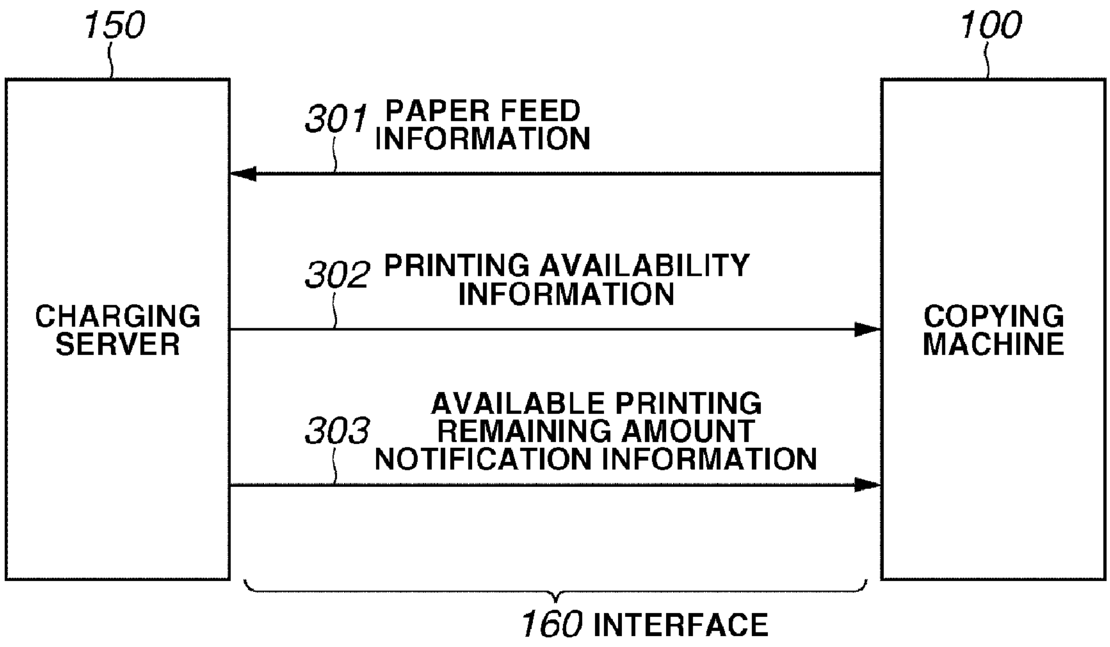
FIG. 3 illustrates data communication performed via an interface according to the first embodiment of the present invention.

FIG. 3 illustrates an example of data communication between the copying machine 100 and the charging server 150 via the interface 160 according to the present embodiment. In the present embodiment, parallel ports are used as the interface 160. Here, paper-feed information 301, print availability information 302, and available printing remaining amount notification information 303 are respectively allocated to the parallel ports. An arrow in FIG. 3 indicates a direction of transmission of each of the paper-feed information 301, the print availability information 302, and the available printing remaining amount notification information 303.

The paper-feed information (first information in the present embodiment) 301 is output from the copying machine 100 to the charging server 150 every time the paper-feed roller 258 picks up print paper from either the paper cassette 256, the paper cassette 257, or the manual feed tray 259. In the present embodiment, pulse information only is output from the copying machine 100 to the charging server 150 to notify the charging server 150 that the copying machine 100 has fed print paper (or has fed no print paper). However, in other embodiments, the paper-feed information 301 can include information indicating print parameters (parameters for the number of documents, the number of copies, the paper size, and the color mode (monochromatic/color)), which have been previously set by a user.

The print availability information 302 is output from the charging server 150 to the copying machine 100. The print availability information 302 includes information about the availability of printing by the copying machine 100. The charging server 150 calculates the available printing remaining amount (the remaining fee amount or the number of remaining copies that can be output) based on the paper-feed information 301 that has been notified from the copying machine 100, and then determines whether performing of print processing is available based on a result of the calculation.

If it is determined that performing of the print processing is available, the charging server 150 sends information indicating permission of performing the print processing to the copying machine 100 as the print availability information 302. On the other hand, if it is determined that performing of the print processing is not available, the charging server 150 sends information indicating that performing of the print processing is not available to the copying machine 100 as the print availability information 302. The copying machine 100 performs or does not to perform the print processing based on the print availability information 302 notified from the charging server 150.

The available printing remaining amount notification information (second notification information in the present embodiment) 303 is information for notifying the copying machine 100 that the available printing remaining amount, whose information is managed by the charging server 150, has become equal to or less than a predetermined value. Here, the “available printing remaining amount” refers to, for example, the amount of paid fee calculated by subtracting the amount of fee for the already-performed print processing from the amount of the fee that the user has previously paid.

If the available printing remaining amount is short of the fee for completely performing the instructed print processing, the copying machine 100 is instructed by the charging server 150 not to perform the print processing based on the received print availability information 302. In this regard, in the following case, the copying machine 100 cannot immediately follow the instruction from the charging server 150. That is, the copying machine 100 cannot follow the instruction for not performing print processing in the case where the copying machine 100 has already started a paper-feed operation or a print operation before receiving a notification of the print availability information 302, which is output from the charging server 150 according to the paper-feed information 301 sent from the copying machine 100. In such a case where the copying machine 100 is instructed from the charging server 150 not to continue the current print processing, the copying machine 100 cannot immediately suspend the currently-performed paper-feed operation or print operation, as described above.

In this regard, in the present embodiment, when the charging server 150 detects that the available printing remaining amount has become small, the charging server 150 notifies so to the copying machine 100 before instructing the copying machine 100 to suspend the current operation. Thus, the copying machine 100 can slow down the print processing in preparation for suspending it.

More specifically, the copying machine 100 can slow down the print processing by enlarging a print paper conveyance interval, for example. Thus, the copying machine 100 can appropriately control performing print processing according to the received print availability information 302. It is also useful, in slowing down the print processing, to change a print order in the case of two-sided printing or a paper-feeding order in the case of feeding print paper from a plurality of paper-feed units.

The timing at which the charging server 150 notifies the copying machine 100 that the available printing remaining amount has become small with the available printing amount notification information 303 can be optimally set according to a method of managing charging information used by the charging server 150.

That is, in the case where the charging-information management unit 152 of the charging server 150 manages information about the remaining amount of the fee that the user has paid, the charging server 150 performs notification to the copying machine 100 at a timing at which the remaining fee amount reaches or becomes less than a predetermined value. In the case where the charging-information management unit 152 manages information about a remaining amount of copies available to the user, which has been previously set corresponding to the user, the charging server 150 performs notification to the copying machine 100 at a timing at which the remaining amount of copies available to the user reaches or becomes less than a predetermined number of copies.

Figure 4:
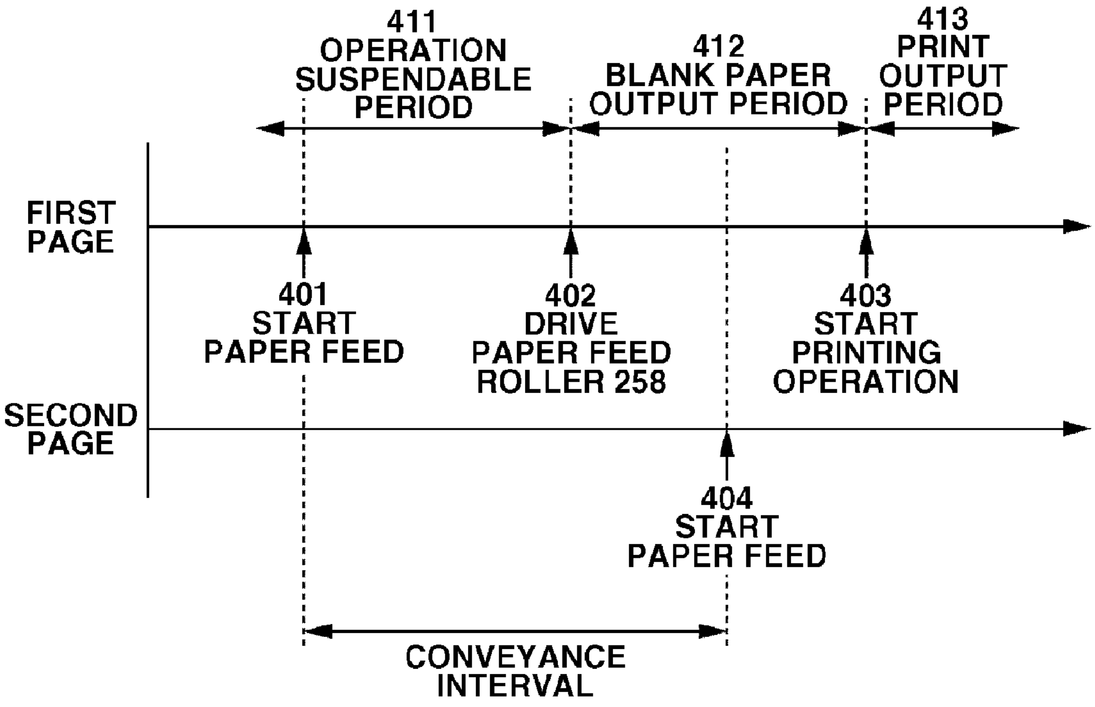
FIG. 4 illustrates a timing chart for a paper-feed operation and a print operation according to the first embodiment of the present invention.

FIG. 4 illustrates an example of a timing chart for the paper-feed operation and the print operation by the copying machine 100 according to the present embodiment. Referring to FIG. 4, at timing 401, the copying machine 100 starts a paper-feed operation for the first page. At this time, the copying machine 100 outputs the paper-feed information 301 to the charging server 150.

At timing 402, the copying machine 100 drives the paper-feed roller 258 to actually pick up and feed print paper from either the paper cassette 256, the paper cassette 257, or the manual feed tray 259. At timing 403, the copying machine 100 starts a print operation for the conveyed print paper. At timing 404, the copying machine 100 starts a paper-feed operation for the second page. That is, the interval between the timings 401 and 404 is equivalent to the time interval for conveying print paper. As the time interval between feeding a print paper sheet and feeding a subsequent print paper sheet becomes larger, the speed of performing print processing becomes lower.

As described above, in the case where it is instructed by the charging server 150 not to perform print processing based on the print availability information 302 from the charging server 150 according to the paper-feed information 301 output at the timing 401, it is necessary to suspend a paper-feed operation and a print operation by the copying machine 100. However, if the copying machine 100 has already started a paper-feed operation or a print operation, the copying machine 100 cannot suspend the current operation in some cases. Whether the copying machine 100 can suspend the current paper feed or print operation depends on the degree of progress of the operation.

The time periods from the timing 401 to the timing 402 (the timing for driving the paper-feed roller 258) correspond to an operation suspendable period 411. If it is instructed by the charging server 150 not to perform print processing during the operation suspendable period 411, the copying machine 100 can suspend the paper-feed operation and can also perform control not to carry out print processing. The time period from the timing 402 (the timing for driving the paper-feed roller 258) to the timing 403 (the timing for starting print processing) correspond to a blank paper output period 412. If it is instructed by the charging server 150 not to perform print processing during the blank paper output period 412, the copying machine 100 cannot suspend the paper-feed operation, but can perform control not to carry out print processing. That is, in this case, the print paper is fed but image data is not actually printed on the fed print paper (the print paper is output as it is as blank paper).

The time period after the timing 403 (the timing for starting print processing) corresponds to a print output period 413. If it is instructed by the charging server 150 not to perform print processing, the copying machine 100 cannot suspend the print operation. That is, during the print output period 413, if it is instructed by the charging server 150 not to perform print processing, the copying machine 100 completes the print processing on the page whose processing is at this stage.

Figure 5:
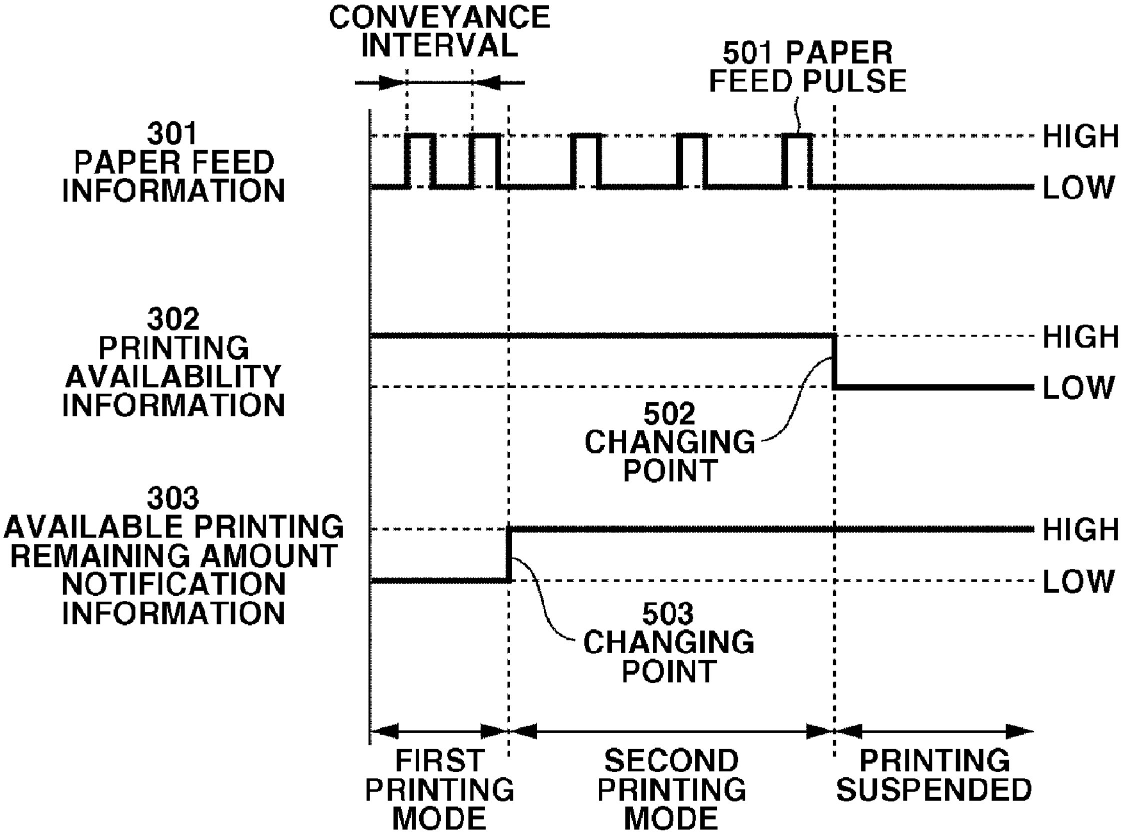
FIG. 5 illustrates a relationship between a notification of each information via the interface and a control operation for a printing mode in the copying machine according to the first embodiment of the present invention.

FIG. 5 illustrates a relationship between the notification of each information (the paper-feed information 301, the print availability information 302, and the available printing remaining amount notification information 303) via the interface 160 and the control of a printing mode in the copying machine 100 according to the present embodiment. Here, each of the paper-feed information 301, the print availability information 302, and the available printing remaining amount notification information 303 is transmitted as either a high signal or a low signal.

Referring to FIG. 5, the copying machine 100 outputs a paper-feed pulse 501, as the paper-feed information 301, to the charging server 150 to notify the charging server 150 that the copying machine 100 is to feed print paper to be used for the print processing instructed by a user. The charging server 150 outputs a high signal, as the print availability information 302, if the charging server 150 allows the copying machine 100 to perform print processing. On the other hand, if the charging server 150 does not allow the copying machine 100 to perform print processing, the charging server 150 outputs a low signal as the print availability information 302.

Furthermore, the charging server 150 outputs a low signal, as the available printing remaining amount notification information 303, if it is determined that the available printing remaining amount is large enough to perform the print processing based on the charging information managed with the charging-information management unit 152. On the other hand, if it is determined that the available printing remaining amount has become small, the charging server 150 outputs a high signal as the available printing remaining amount notification information 303.

Now, two printing modes (a first printing mode and a second printing mode) for the copying machine 100 will be described below. The "first printing mode" refers to a printing mode for performing print processing in the case where the available printing remaining amount indicated by the charging information is large enough to perform the instructed print processing. The first printing mode prioritizes the efficiency for performing print processing. In the first printing mode, the print paper conveyance interval is smaller than that in the second printing mode, as can be known from FIG. 5. That is, in the first printing mode, the print processing is performed at a high speed.

The "second printing mode" refers to a printing mode for performing print processing in the case where the available printing remaining amount indicated by the charging information has become small. The second printing mode is used for appropriately suspending the print processing. In the second printing mode, the print paper conveyance interval is larger than that in the first printing mode, as can be known from FIG. 5. That is, in the second printing mode, the print processing is performed at a low speed.

When the copying machine 100 is in the second printing mode, if the available printing remaining amount indicated by the charging information has become small and it is instructed by the charging server 150 not to perform print processing, the copying machine 100 can quickly suspend the paper-feed operation and the print operation.

The copying machine 100 is basically in the first printing mode (that is, when the available printing remaining amount is sufficient). If it is notified from the charging server 150 that the available printing remaining amount has become small (a changing point 503 in FIG. 5), the copying machine 100 changes its printing mode to the second printing mode to perform the print processing. If the available printing remaining amount has become short and it is instructed by the charging server 150 not to perform the print processing (a changing point 502 in FIG. 5), the copying machine 100 suspends the paper-feed operation and the print operation.

Now, a difference between the first and the second modes in the case of two-sided printing for printing image data on both sides of print paper according to the present embodiment will be described below.

Figure 6:
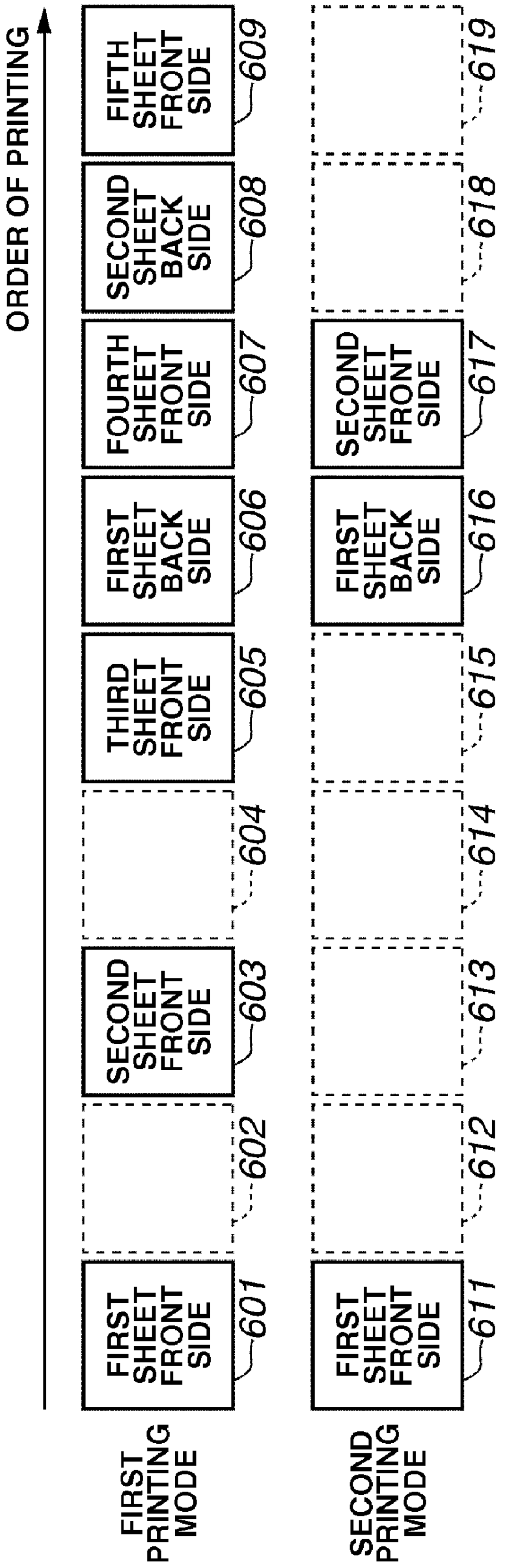
FIG. 6 illustrates a print order in a two-sided printing mode according to the first embodiment, which differs between first and second printing modes.

FIG. 6 illustrates an example of a print order in a two-sided printing mode according to the present embodiment, which differs between the first and the second printing modes. Here, the copying machine 100, as described above with reference to FIG. 2, guides print paper having been fed from the paper cassette 256 and having an image on its front side into the paper re-feed conveyance path 255. Thus, the copying machine 100 can form an image on both sides of the print paper.

Referring to FIG. 6, in the first printing mode, the copying machine 100 forms an image on the front side of the first print paper. Then, before forming an image on the back side of the first print paper, forms images on the front sides of the second print paper and the third print paper. Thus, the copying machine 100, after forming an image on the front side of the first print paper and during a time period in which the first print paper having an image on its front side is conveyed through the paper re-feed conveyance path 255, starts forming an image on the front sides of subsequent print paper sheets. Accordingly, an amount of wasted time can be reduced and the print efficiency can improve.

More specifically, as illustrated in FIG. 6, the copying machine 100 performs print processing on the front side of the first print paper in a time period 601. Then, in a time period 602, the copying machine 100 does not perform print processing on any print paper. In a time period 603, the copying machine 100 performs print processing on the front side of the second print paper. After that, in the same manner, the copying machine 100 does not perform print processing on any print paper in a time period 604, and in time periods 605 through 609, the copying machine 100 performs print processing on the front side of the third print paper, on the back side of the first print paper, on the front side of the fourth print paper, on the back side of the second print paper, and on the front side of the fifth print paper, respectively.

Meanwhile, in the first printing mode for performing print processing in a print order different from a page order of print products to be actually output as a result of the above-described print processing, the following problem may occur. That is, in the case of the first printing mode, if the available printing remaining amount becomes short at the timing at which the paper-feed operation is performed for the print processing in the time period 606, image data is appropriately printed on both sides of the first print paper, but the second and the third print paper sheets have image data only on their front sides. That is, in this case, the second and the third print paper sheets are discharged in an incompletely-printed state (a state in which the print paper has image data on one side only).

On the other hand, in the second printing mode, after having performed print processing on the front side of the first print paper in a time period 611 (FIG. 6), the copying machine 100 does not perform print processing on any print paper in time periods 612 through 615, and performs print processing on the back side of the first print paper in a time period 616. Then, the copying machine 100 performs print processing on the front side of the second print paper in a time period 617. The copying machine 100 does not perform any print processing until the second print paper returns through the paper re-feed conveyance path 255 (time periods 618 and 619).

Thus, if the available printing remaining amount becomes short during print processing, it can be prevented to discharge an incompletely-printed product. That is, if, for example, the available printing remaining amount has become short at the timing at which the print paper for the print processing for the fourth page is fed, as in the above-described case, the first and the second print paper sheets, both of which having image data on both sides thereof, are discharged in the second printing mode.

Now, a difference will be described below between the first and the second modes according to the present embodiment in the case where a paper-feed deck different from the paper cassettes 256 and 257 and connected to the manual feed tray 259 is used.

Figure 7:
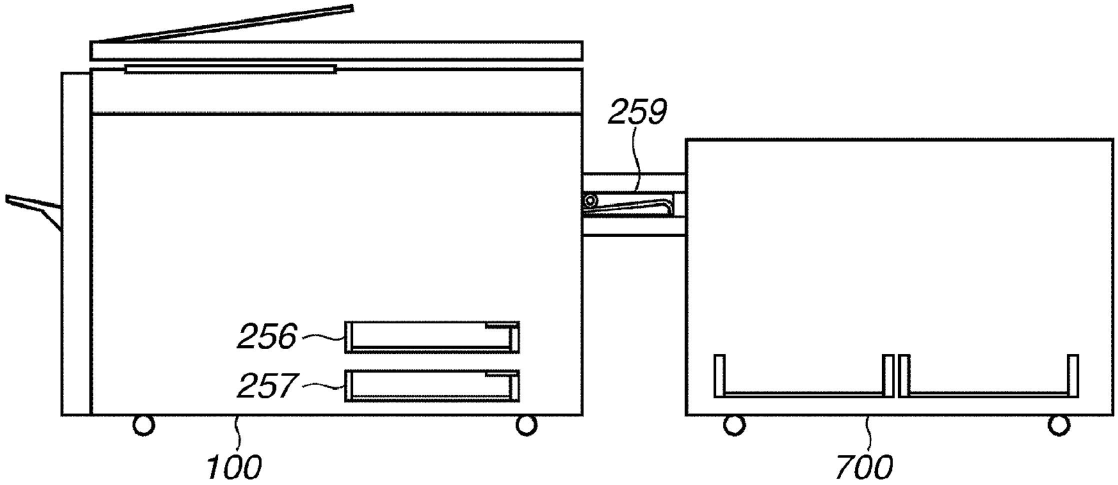
FIG. 7 is a cross-section of the copying machine and a paper-feed deck connected thereto according to the first embodiment of the present invention.

FIG. 7 is a cross section of the copying machine 100 and a paper-feed deck 700 connected thereto according to the present embodiment. Referring to FIG. 7, the paper-feed deck 700 can stack a large amount of print paper. In the case of feeding print paper from the paper-feed deck 700, the print paper is conveyed via the manual feed tray 259 of the copying machine 100. When the paper-feed deck 700 is used, print paper whose type (the paper size and the paper type) is different from that on the paper cassettes 256 and 257 of the copying machine 100 can be stacked on the paper-feed deck 700.

Here, a case will be described where the copying machine 100 performs print processing on first through third pages and where the print paper fed from the paper cassette 256 is used for the print processing on the first and the second pages while the print paper fed from the paper-feed deck 700 is used for the print processing on the third page.

Figure 8:
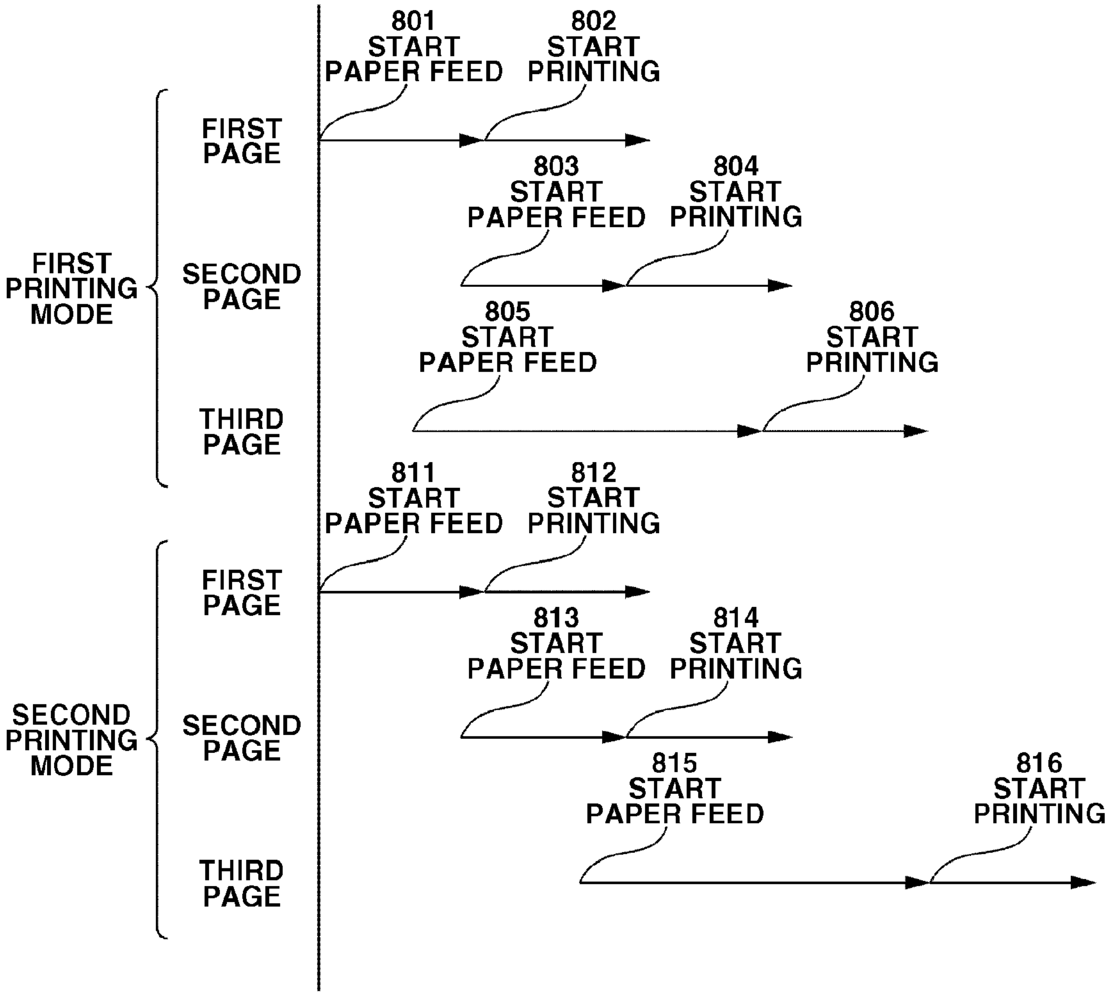
FIG. 8 is a timing chart illustrating a timing of starting feeding of or printing on a print paper used for print processing on each page in each of the first printing mode and the second printing mode according to the first embodiment of the present invention.

FIG. 8 is a timing chart illustrating a timing of starting feeding of or printing on print paper used for print processing on each page in each of the first printing mode and the second printing mode according to the present embodiment. In the first printing mode, at timing 801, the copying machine 100 starts an operation for feeding print paper used in the print processing on the first page. At timing 802, the copying machine 100 starts the print operation on the first page.

At timing 805, namely, before the timing 803 for feeding print paper for the print processing on the second page, the copying machine 100 starts a print paper-feed operation for the print processing on the third page. This is intended to reduce a waste of time arising in the case of feeding print paper from the paper-feed deck 700, in which case it takes a relatively long time for feeding print paper compared to that in the case of feeding print paper from the paper cassette 256, due to a long conveyance path existing between the copying machine 100 and the paper-feed deck 700. As described above, the present embodiment starts a paper-feed operation for printing pages whose conveyance path is long at a stage earlier than that for pages whose conveyance path is relatively short. Thus, the present embodiment can reduce a waste of time arising before starting a print operation. Accordingly, the print efficiency can improve. For the second page, the print operation starts at timing 804. For the third page, the print operation starts at timing 806.

Meanwhile, in the first printing mode for performing a paper-feed operation in an order different from a page order of print products to be actually output as a result of the print processing, the following problem may occur. That is, in the case of the first printing mode, if the available printing remaining amount becomes short at the timing at which the paper-feed operation is performed in the timing 805, the copying machine 100 cannot start the paper-feed operation for the second page at the timing 803. Thus, in a resulting print product, the third page has been appropriately printed but the second page has not been printed. That is, a phenomenon of unprinted page may occur.

On the other hand, in the second printing mode, the copying machine 100 starts the paper-feed operation for the second page at timing 813, which is after timing 811 for starting the paper-feed operation for the first page, as illustrated in FIG. 8. Then, the copying machine 100 starts the paper-feed operation for the third page at timing 815. The print operation for each of the first through the third pages starts at timing 812, timing 814, and timing 816, respectively.

Thus, the copying machine 100 starts the paper-feed operation in the same order as the page order of print products to be actually output. Accordingly, although a little wasted time may arise before starting the print operation for the third page, the present embodiment can reduce the above-described problem even in the case where the available printing remaining amount has become short during the print processing.

As described above, in the first embodiment, the copying machine 100 controls performing print processing by appropriately shifting between the first printing mode and the second printing mode, in which the number of pages to be printed in a unit time is smaller than that in the case of the first printing mode.

Figure 9:
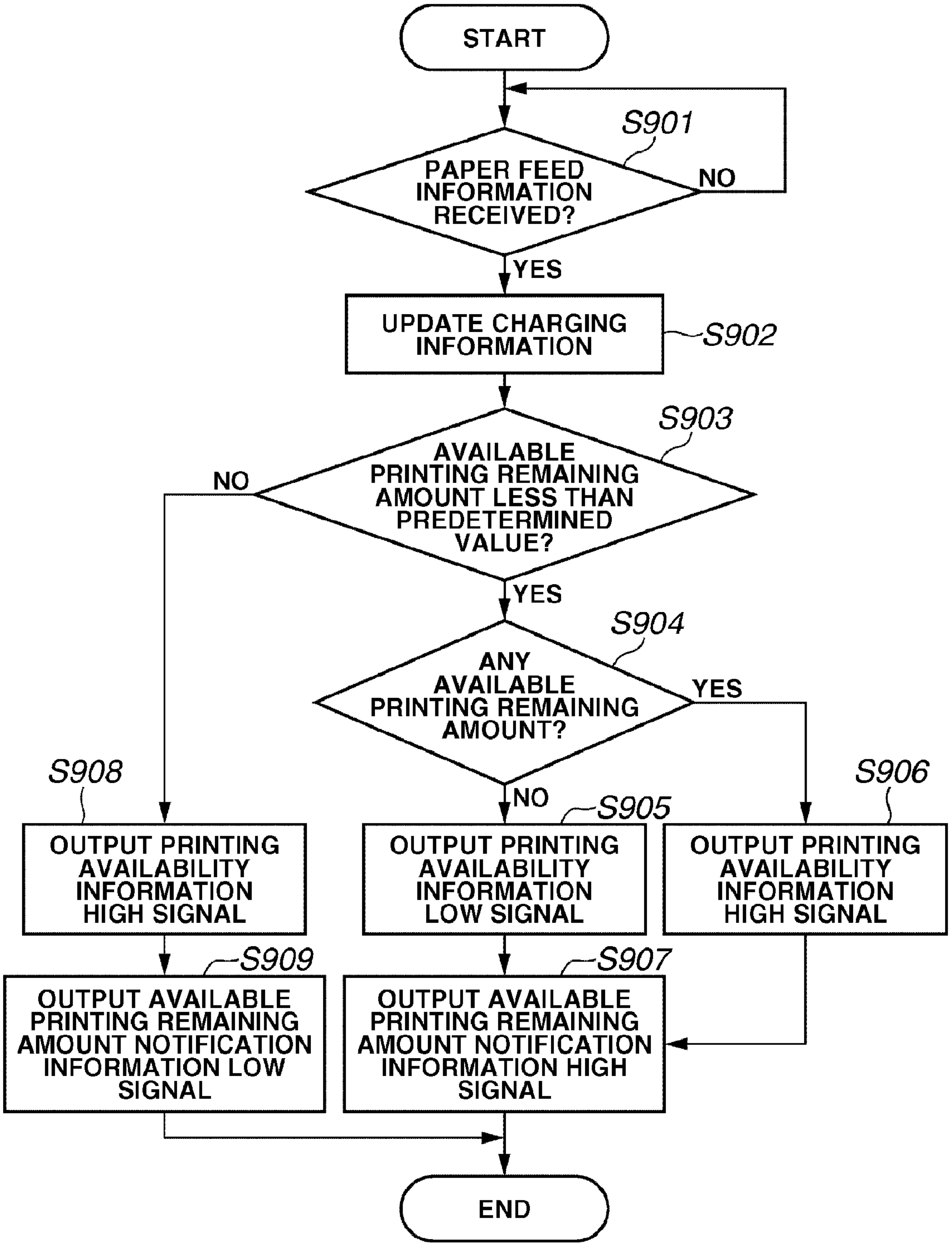
FIG. 9 is a flow chart illustrating an operation of a charging server according to the first embodiment of the present invention.

FIG. 9 is a flow chart illustrating an example of series of processing in which the charging server 150 receives the paper-feed information 301 from the copying machine 100 and outputs the print availability information 302 and the available printing remaining amount notification information 303 according to the present embodiment. The series of processing is controlled by the control unit 151 of the charging server 150 based on a program stored on a memory (not illustrated).

Referring to FIG. 9, in step S901, the control unit 151 checks whether the paper-feed information 301 has been received from the copying machine 100. If it is determined in step S901 that the paper-feed information 301 has been received from the copying machine 100 (YES in step S901), then the control unit 151 advances to step S902. In step S902, the control unit 151, based on the paper-feed information 301 received from the copying machine 100, updates the charging information managed by the charging-information management unit 152.

In step S903, the control unit 151 determines whether the available printing remaining amount indicated by the updated charging information is less than a predetermined value (the predetermined value is greater than 0). If it is determined in step S903 that the available printing remaining amount is less than the predetermined value (YES in step S903), then the control unit 151 advances to step S904. In step S904, the control unit 151 determines whether any available printing remaining amount is left.

The determination as to whether any available printing remaining amount is left can be performed by determining whether a printing remaining amount for performing the most inexpensive print processing, of print processings that can be performed by the copying machine 100, is left. Alternatively, the determination as to whether any available printing remaining amount is left can be performed by determining whether a printing remaining amount for performing the most expensive print processing, of print processings that can be performed by the copying machine 100, is left.

If it is determined in step S904 that no available printing remaining amount is left (NO in step S904), then the control unit 151 advances to step S905. In step S905, the control unit 151 outputs a low signal (FIG. 5) as the print availability information 302. In step S907, the control unit 151 outputs a high signal (FIG. 5) as the available printing remaining amount notification information 303.

On the other hand, if it is determined in step S904 that an available printing remaining amount is left (YES in step S904), then the control unit 151 advances to step S906. In step S906, the control unit 151 outputs a high signal (FIG. 5) as the print availability information 302. In step S907, the control unit 151 outputs a high signal (FIG. 5) as the available printing remaining amount notification information 303.

If, on the other hand, it is determined in step S903 that the available printing remaining amount is not less than the predetermined value (NO in step S903), then the control unit 151 advances to step S908. In step S908, the control unit 151 outputs a high signal (FIG. 5) as the print availability information 302. In step S909, the control unit 151 outputs a low signal (FIG. 5) as the available printing remaining amount notification information 303.

Figure 10:
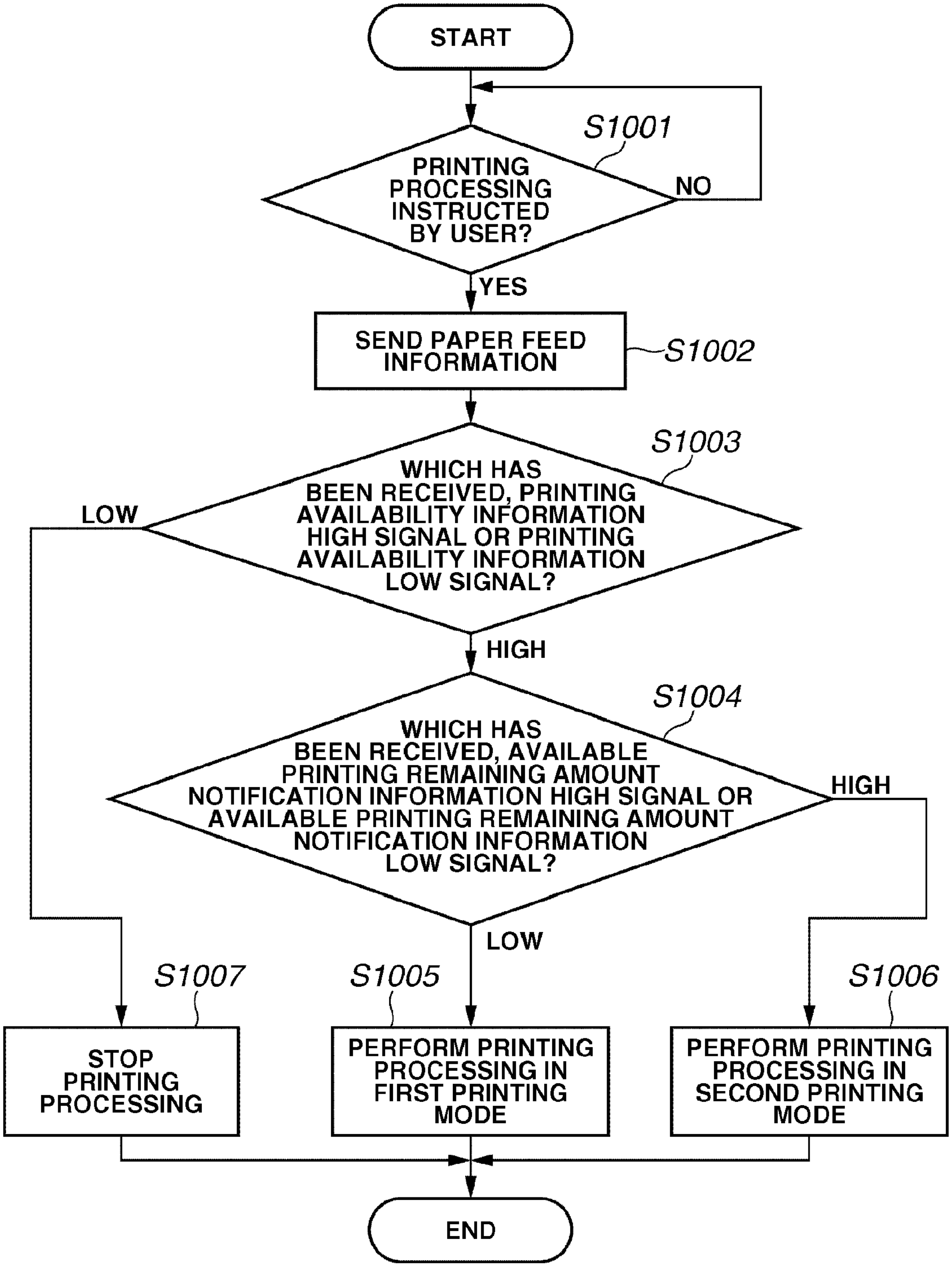
FIG. 10 is a flow chart illustrating an operation of the copying machine according to the first embodiment of the present invention.

FIG. 10 is a flow chart illustrating an example of a series of processing in which the copying machine 100 sends the paper-feed information 301 to the charging server 150 and performs control for performing print processing based on the print availability information 302 and the available printing remaining amount notification information 303 according to the present embodiment. The series of processing is controlled by the CPU 111 of the copying machine 100 based on a program stored on each memory in the control unit 110.

Referring to FIG. 10, in step S1001, the CPU 111 determines whether the user has issued an instruction for performing print processing. If it is determined in step S1001 that the user has issued an instruction for performing print processing (YES in step S1001), then the CPU 111 advances to step S1002. In step S1002, the CPU 111 sends the paper-feed information 301 for print processing to be performed to the charging server 150. The paper-feed information 301 can include information on various parameters related to the print processing to be performed as well as information as to whether to perform a paper-feed operation.

In step S1003, the CPU 111 determines which of a high signal or a low signal has been sent from the charging server 150 as the print availability information 302. If the high signal has been sent from the charging server 150 as the print availability information 302, the print processing is available. On the other hand, if the low signal has been sent from the charging server 150 as the print availability information 302, the print processing is not available.

If it is determined in step S1003 that the low signal has been sent from the charging server 150 as the print availability information 302, then the CPU 111 advances to step S1007. In step S1007, the CPU 111 suspends the print processing. Here, the print processing can be only temporarily suspended to prepare for resuming the print processing if the user pays the necessary amount of fee.

On the other hand, if it is determined in step S1003 that the high signal has been sent from the charging server 150 as the print availability information 302, then the CPU 111 advances to step S1004. In step S1004, the CPU 111 determines which of a high signal or a low signal has been sent from the charging server 150 as the available printing remaining amount notification information 303. If the high signal has been sent from the charging server 150 as the available printing remaining amount notification information 303, the available printing remaining amount is small. On the other hand, if the low signal has been sent from the charging server 150 as the available printing remaining amount notification information 303, the available printing remaining amount is sufficient.

If it is determined in step S1004 that the low signal has been sent from the charging server 150 as the available printing remaining amount notification information 303, then the CPU 111 advances to step S1005. In step S1005, the CPU 111 performs control for performing the print processing in the above-described first printing mode. On the other hand, if it is determined in step S1004 that the high signal has been sent from the charging server 150 as the available printing remaining amount notification information 303, then the CPU 111 advances to step S1006, in preparation for performing processing in the case of receiving the low signal from the charging server 150 as the print availability information 302. In step S1006, the CPU 111 performs control for performing the print processing in the above-described second printing mode.

In the case of performing print processing of image data for a plurality of pages, the print processing is performed according to the flow of processing in FIG. 10 with respect to each of the plurality of pages.

As described above, the first embodiment performs control by shifting between the first printing mode, which prioritizes the print efficiency, and the second printing mode, which reduces performing print processing beyond the available printing remaining amount and discharging of an incompletely-printed product.

One difference point between the first and the second printing modes is that the print paper conveyance interval in the second printing mode is different from that in the first printing mode. That is, in the second printing mode, the print paper conveyance interval is relatively larger than that in the first printing mode to perform the print processing in a relatively low speed.

Another difference between the first and the second printing modes is that the order of printing the pages in the print processing in the case of two-sided printing in the second printing mode is different from that in the first printing mode. That is, in the first printing mode, the print processing is performed in an order different from the page order of print products to be output, while in the second printing mode, the print processing is performed in the same order as the page order of print products to be output.

Yet another difference between the first and the second printing modes is that the timings of starting the paper-feed operation in the second printing mode are different from those in the first printing mode. That is, in the first printing mode, the paper-feed operations start in an order different from the page order of print products to be output, while in the second printing mode, the paper-feed operations start in the same order as the page order of print products to be output.

As described above, the present embodiment performs control so that the print processing is performed at a relatively low speed in the case where the available printing remaining amount indicated by the charging information is less than the predetermined value. Accordingly, the present embodiment can appropriately perform processing for printing image data, and thus can perform print processing with a high efficiency.

Second Embodiment

Now, a second embodiment of the present invention will be described below. In the first embodiment, a parallel port interface is used as the interface 160, while in the second embodiment, a serial port interface is used as the interface 160. It is to be noted here that a basic configuration of the second embodiment is similar to that of the first embodiment. Accordingly, a detailed description as to components or points that are similar to those in the first embodiment will not be repeated here, and only the points in difference from the first embodiment will be described.

Figure 11:
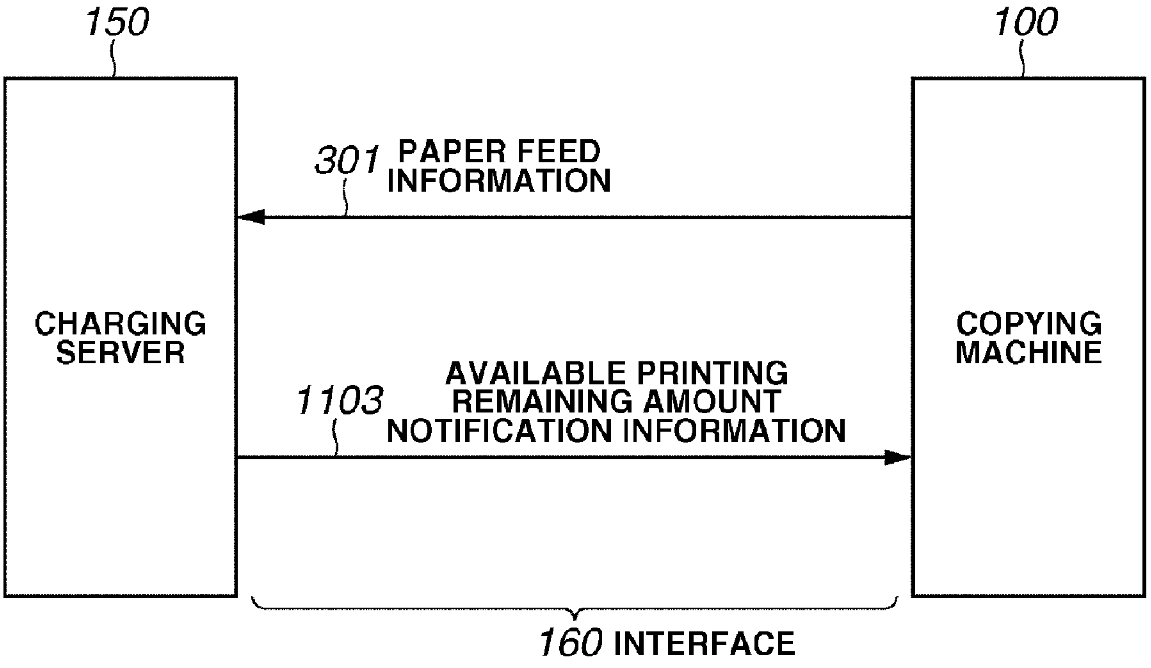
FIG. 11 illustrates data communication performed via an interface according to a second embodiment of the present invention.

FIG. 11 illustrates an example of data communication between the copying machine 100 and the charging server 150 via the interface 160 according to the present embodiment. Here, the paper-feed information 301 is similar to that described above in the first embodiment. Accordingly, the paper-feed information 301 will not be described in detail here. Referring to FIG. 11, available printing remaining amount notification information 1103 directly indicates the available printing remaining amount indicated by the charging information managed by the charging-information management unit 152 of the charging server 150, differently from the print availability information 302 and the available printing remaining amount notification information 303 in the first embodiment.

In the case of using a serial port interface, data communication can be more flexibly performed than in the case of using a parallel port interface. Accordingly, in the second embodiment, information including a more detailed content is transmitted than that in the first embodiment, which uses the high signal and the low signal only. That is, in the second embodiment, the charging server 150 can send specific information about how much the remaining amount of paid fee is left as the available printing remaining amount or about the number of prints left available, to the copying machine 100.

In the present embodiment, the control unit 110 of the copying machine 100 can control the charging-information management unit 152 of the charging server 150 via the interface 160. In this case, it is not required to provide the charging server 150 with a control unit.

Figure 12:
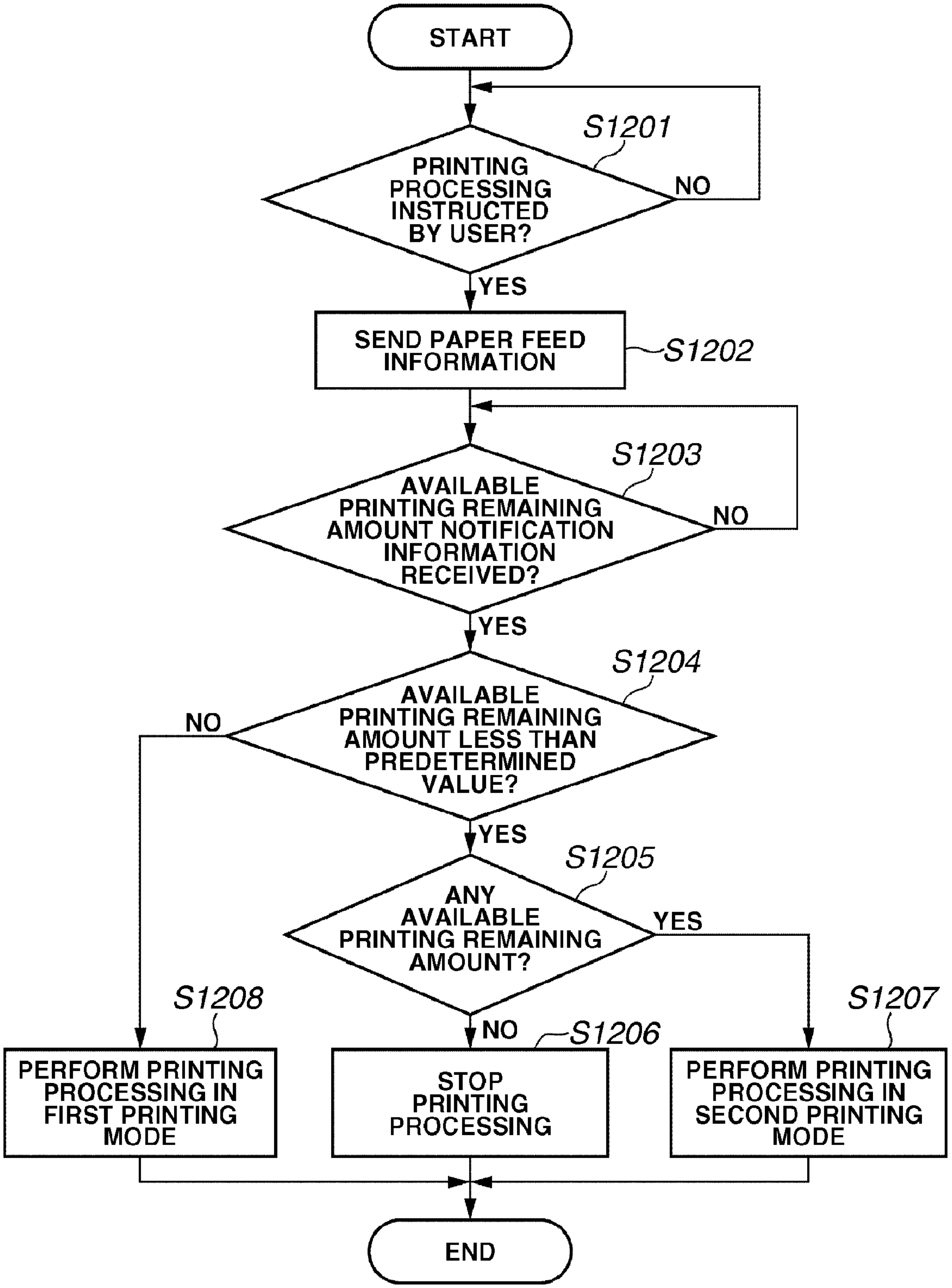
FIG. 12 is a flow chart illustrating an operation of the copying machine according to the second embodiment of the present invention.

FIG. 12 is a flow chart illustrating an example of a series of processing in which the copying machine 100 sends the paper-feed information 301 to the charging server 150 and performs control for performing print processing based on the available printing remaining amount notification information 1103 according to the present embodiment. The series of processing is controlled by the CPU 111 of the copying machine 100 based on a program stored on each memory in the control unit 110.

Referring to FIG. 12, in step S1201, the CPU 111 determines whether the user has issued an instruction for performing print processing. If it is determined in step S1201 that the user has issued an instruction for performing print processing (YES in step S1201), then the CPU 111 advances to step S1202. In step S1202, the CPU 111 sends the paper-feed information 301 for print processing to be performed to the charging server 150. The paper-feed information 301 can include information on various parameters related to the print processing to be performed as well as information as to whether to perform a paper-feed operation.

In step S1203, the CPU 111 determines whether the copying machine 100 has received the available printing remaining amount notification information 1103 from the charging server 150. If it is determined in step S1203 that the copying machine 100 has received the available printing remaining amount notification information 1103 from the charging server 150 (YES in step S1203), then the CPU 111 advances to step S1204. In step S1204, the CPU 111 determines whether the available printing remaining amount indicated by the available printing remaining amount notification information 1103 received from the charging server 150 is less than a predetermined value.

If it is determined in step S1204 that the available printing remaining amount indicated by the available printing remaining amount notification information 1103 received from the charging server 150 is not less than the predetermined value (NO in step S1204), then the CPU 111 advances to step S1208. In step S1208, the CPU 111 performs the print processing in the first printing mode. On the other hand, if it is determined in step S1204 that the available printing remaining amount indicated by the available printing remaining amount notification information 1103 received from the charging server 150 is less than the predetermined value (YES in step S1204), then the CPU 111 advances to step S1205. In step S1205, the CPU 111 determines whether any available printing remaining amount is left.

The determination as to whether any available printing remaining amount is left can be performed by determining whether a printing remaining amount for performing the most inexpensive print processing, of print processings that can be performed by the copying machine 100, is left. Alternatively, the determination as to whether any available printing remaining amount is left can be performed by determining whether a printing remaining amount for performing the most expensive print processing, of print processings that can be performed by the copying machine 100, is left.

If it is determined in step S1205 that an available printing remaining amount is left (YES in step S1205), then the CPU 111 advances to step S1207. In step S1207, the CPU 111 performs the print processing in the second printing mode. On the other hand, if it is determined in step S1205 that no available printing remaining amount is left (NO in step S1205), then the CPU 111 advances to step S1206. In step S1206, the CPU 111 suspends the print processing.

In the second embodiment, the charging server 150 notifies the copying machine 100 of the available printing remaining amount. In the first embodiment, the charging server 150 determines whether the available printing remaining amount is less than the predetermined value and whether any available printing remaining amount is left, and sends the result of the determination to the copying machine 100. On the other hand, in the second embodiment, the copying machine 100, based on the available printing remaining amount notification information 1103, which is notified from the charging server 150, determines whether the available printing remaining amount is less than the predetermined value and whether any available printing remaining amount is left, to control performing print processing based on the determination results.

Accordingly, in the second embodiment, it is not necessary for the charging server 150 to perform complicated processing and thus needs only to simply perform a management of the charging information. Thus, a more inexpensive charging server 150 can be used.

Third Embodiment

Now, a third embodiment of the present invention will be described below. In the first and the second embodiments, the image-processing system including a plurality of different apparatuses (the copying machine 100 and the charging server 150) has been described. In the third embodiment, an image-forming apparatus having both of the functions of the image-processing system in the first and the second embodiments will be described.

Figure 13:
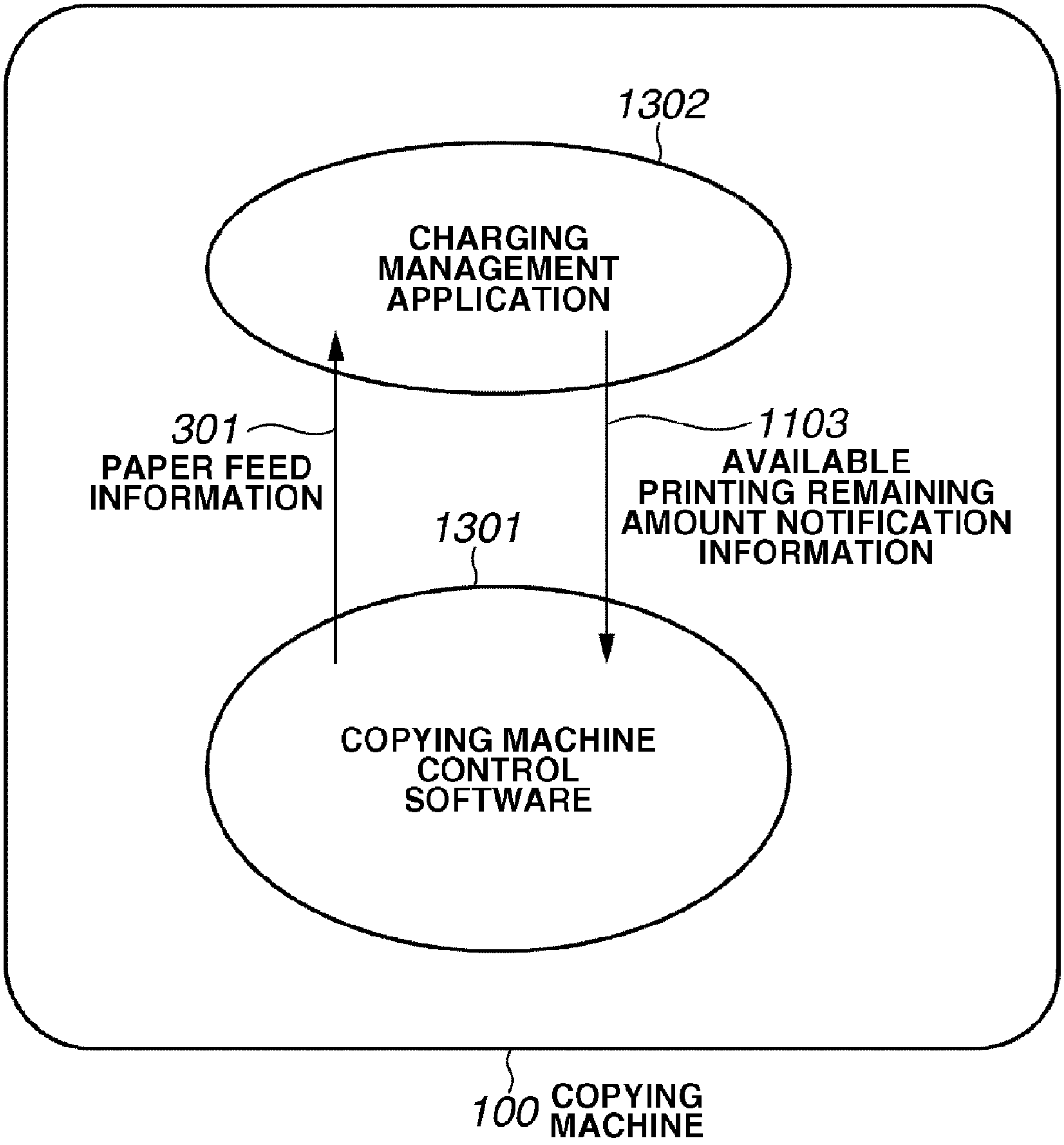
FIG. 13 illustrates the software configuration of the copying machine according to a third embodiment of the present invention.

FIG. 13 illustrates an example of a software configuration of the copying machine 100 according to the present embodiment. In the third embodiment, the copying machine 100 includes each function of the charging server 150 in the first and the second embodiments. More specifically, as illustrated in FIG. 13, the copying machine 100 according to the present embodiment includes a charging management application 1302 for managing charging information, in addition to copying-machine control software 1301 for controlling the copying machine 100 (including the scanner 130 and the printer 140).

The copying-machine control software 1301 sends and receives information such as the paper-feed information 301 or the available printing remaining amount notification information 1103 to and from the charging management application 1302, and controls performing print processing based on the paper-feed information 301 or the available printing remaining amount notification information 1103. Here, the detailed content of the control is the same as that in the first and the second embodiments. Accordingly, the detailed description thereof will not be repeated here.

As described above, in the third embodiment, the copying machine 100 manages the charging information and controls performing print processing within the copying machine 100 based on the thus managed charging information. Accordingly, it is not necessary to separately provide a charging apparatus.

It is to be noted here that in the above-described first through the third embodiments, the print processing is performed in the first printing mode or the second printing mode for performing the print processing at a speed lower than that in the first printing mode. However, the present invention is not limited to this. That is, instead of the method for controlling performing print processing by selecting the printing mode between the first printing mode and the second printing mode, any method can be employed as long as the speed of performing print processing can be reduced according to the available printing remaining amount indicated by the charging information.

Other Embodiments

The present invention can be implemented in a system, an apparatus, a method, a program, or a storage medium storing the program, for example. More specifically, the present invention can be applied to a system including a plurality of devices and to an apparatus that includes one device.

The present invention can be implemented by directly or remotely supplying a software program implementing functions of the above-described embodiments (in the embodiments, the program corresponding to the processing performed according to the flow charts in the drawings) to a system or an apparatus and reading and executing supplied program code with a computer of the system or the apparatus.

Accordingly, the program code itself, which is installed on the computer for implementing the functional processing with the computer, embodies the present invention. That is, the present invention also includes the computer program implementing the functional processing of the embodiments.

Accordingly, the program can be configured in any form, such as object code, a program executed by an interpreter, and script data supplied to an operating system (OS).

As the recording medium for supplying such program code, a floppy disk, a hard disk, an optical disk, a magneto-optical disk (MO), a compact disc-read only memory (CD-ROM), a CD-recordable (CD-R), a CD-rewritable (CD-RW), a magnetic tape, a nonvolatile memory card, a ROM, and a digital versatile disc (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium, such as a hard disk. In addition, the above program can also be supplied by downloading a compressed file that includes an automatic installation function from the web site to a recording medium, such as a hard disk. The functions of the above-described embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium, such as a CD-ROM, which stores the program after an encryption thereof, by allowing the user who is qualified for a prescribed condition to download key information for decoding the encryption from the web site via the Internet, and by executing and installing on the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-145450 filed May 31, 2007, which is hereby incorporated by reference herein in its entirety.

What is claimed is:

1. An image processing system comprising:

a printing unit configured to print an image;

a managing unit configured to manage charging information including a printing remaining amount for determining an amount of print processing that may be performed on the printing unit, which printing remaining amount can be adjusted according to print processing by the printing unit; and a control unit configured to slow down a rate of print processing performed by the printing unit if the printing remaining amount indicated by the charging information is less than a predetermined value, wherein, when the printing unit performs two-sided printing on both sides of print paper, the control unit controls the printing unit to perform the print processing of pages in a same order as a page order of print products to be output if the printing remaining amount is less than the predetermined value, and controls the printing unit to perform the print processing of pages in an order different from the page order of print products to be output if the printing remaining amount is not less than the predetermined value.

2. The image processing system according to claim 1, wherein the printing unit performs the print processing in one of a first printing mode and a second printing mode, which second mode causes the print means to perform print processing at a speed lower than a speed in the first printing mode, and wherein the control unit controls the printing unit to perform the print processing by shifting from the first printing mode to the second printing mode if the printing remaining amount indicated by the charging information is less than the predetermined value.

3. The image processing system according to claim 2, wherein a number of copies to be printed in a unit time in the second printing mode is less than that in the first printing mode.

4. The image processing system according to claim 1, wherein the managing unit manages information indicating a remaining amount of fee available for the print processing as the charging information, and wherein the control unit controls the printing unit according to whether the remaining amount of fee available for the print processing is less than a predetermined amount of fee.

5. The image processing system according to claim 1, wherein the managing unit manages information indicating a remaining number of prints available for the print processing as the charging information, and wherein the control unit controls the printing unit according to whether the remaining number of prints available for the print processing is less than a predetermined number of prints.

6. The image processing system according to claim 1, wherein the image processing system comprises an image forming apparatus including the printing unit and the control unit, and a charging apparatus including the managing unit, wherein the image forming apparatus further includes a first notification unit configured to notify information about the print processing performed by the printing unit to the charging apparatus, wherein the charging apparatus includes:

a determining unit configured to determine whether to perform the print processing based on the information notified from the first notification unit and the charging information managed by the managing unit; and an instructing unit configured to instruct the image forming apparatus not to perform the print processing if it is determined by the determining unit not to perform the print processing.

7. The image processing system according to claim 6, wherein the charging apparatus further includes a second notification unit configured to notify the image forming apparatus that the printing remaining amount indicated by the charging information has become equal to or less than the predetermined value.

8. The image processing system according to claim 1, wherein the image processing system comprises an image forming apparatus including the printing unit, the managing unit, and the control unit.

9. An image processing system connectable to a charging apparatus configured to manage charging information, including a printing remaining amount for determining an amount of print processing that may be performed by a printing unit, which printing remaining amount can be adjusted according to print processing by the printing unit, the image processing system comprising:

the printing unit configured to print an image; and a control unit configured to slow down a rate the print processing performed by the printing unit if the printing remaining amount indicated by the charging information managed by the charging apparatus is less than a predetermined value, wherein, when the printing unit performs two-sided printing on both sides of print paper, the control unit controls the printing unit to perform the print processing of pages in a same order as a page order of print products to be output if the printing remaining amount is less than the predetermined value, and controls the printing unit to perform the print processing of pages in an order different from the page order of print products to be output if the printing remaining amount is not less than the predetermined value.

10. A method for controlling an image processing system, the method comprising:

performing print processing for printing an image;

managing charging information, including a printing remaining amount for controlling an amount of printing that may be performed, which printing remaining amount can be adjusted according to the print processing; and slowing down a rate of print processing if the printing remaining amount indicated by the charging information is less than a predetermined value, wherein, when the print processing performs two-sided printing on both sides of print paper, the print processing of pages is performed in a same order as a page order of print products to be output if the printing remaining amount is less than the predetermined value, and the print processing of pages is performed in an order different from the page order of print products to be output if the printing remaining amount is not less than the predetermined value.

11. A method for controlling an image processing system connectable to a charging apparatus configured to manage charging information including a printing remaining amount for controlling an amount of printing that may be performed, which printing remaining amount can be adjusted according to print processing, the method comprising:

performing print processing for printing an image; and slowing down a rate of print processing if the printing remaining amount indicated by the charging information managed by the charging apparatus is less than a predetermined value, wherein, when the print processing performs two-sided printing on both sides of print paper, the print processing of pages is performed in a same order as a page order of print products to be output if the printing remaining amount is less than the predetermined value, and the print processing of pages is performed in an order different from the page order of print products to be output if the printing remaining amount is not less than the predetermined value.

12. A non-transitory computer-readable storage medium storing instructions for execution by an image-processing system, wherein execution of the instructions causes the image processing system to perform a method comprising:

performing print processing for printing an image;

managing charging information, including a printing remaining amount for controlling an amount of printing that may be performed, which printing remaining amount can be adjusted according to the print processing; and slowing down a rate of print processing if the printing remaining amount indicated by the charging information is less than a predetermined value, wherein, when the print processing performs two-sided printing on both sides of print paper, the print processing of pages is performed in a same order as a page order of print products to be output if the printing remaining amount is less than the predetermined value, and the print processing of pages is performed in an order different from the page order of print products to be output if the printing remaining amount is not less than the predetermined value.

13. A non-transitory computer-readable storage medium storing instructions for execution by an image processing system connectable to a charging apparatus configured to manage charging information including a printing remaining amount for controlling an amount of printing that may be performed, which printing remaining amount can be adjusted according to print processing, wherein execution of the instructions causes the image processing system to perform a method comprising:

performing print processing for printing an image; and slowing down a rate of print processing if the printing remaining amount indicated by the charging information managed by the charging apparatus is less than a predetermined value, wherein, when the print processing performs two-sided printing on both sides of print paper, the print processing of pages is performed in a same order as a page order of print products to be output if the printing remaining amount is less than the predetermined value, and the print processing of pages is performed in an order different from the page order of print products to be output if the printing remaining amount is not less than the predetermined value.

14. An image processing system comprising:

a printing unit configured to print an image;

a managing unit configured to manage charging information including a printing remaining amount for determining an amount of print processing that may be performed on the printing unit, which printing remaining amount can be adjusted according to print processing by the printing unit; and a control unit configured to slow down a rate of print processing performed by the printing unit if the printing remaining amount indicated by the charging information is less than a predetermined value, wherein the printing unit comprises a feeding unit configured to feed print paper to be used in the print processing from multiple paper-storage units, and wherein the control unit controls the feeding unit to feed sheets of print paper from the paper-storage units in an order that is the same as an order in which the sheets of print paper appear in print products to be output if the printing remaining amount is less than the predetermined value, and controls the feeding unit to feed sheets of print paper in an order different from the order in which the sheets of paper appear in the print products to be output if the printing remaining amount is not less than the predetermined value.

15. An image processing system connectable to a charging apparatus configured to manage charging information, including a printing remaining amount for determining an amount of print processing that may be performed by a printing unit, which printing remaining amount can be adjusted according to print processing by the printing unit, the image processing system comprising:

the printing unit configured to print an image; and a control unit configured to slow down a rate the print processing performed by the printing unit if the printing remaining amount indicated by the charging information managed by the charging apparatus is less than a predetermined value, wherein the printing unit comprises a feeding unit configured to feed print paper to be used in the print processing from multiple paper-storage units, and wherein the control unit controls the feeding unit to feed sheets of print paper from the paper-storage units in an order that is the same as an order in which the sheets of print paper appear in print products to be output if the printing remaining amount is less than the predetermined value, and controls the feeding unit to feed sheets of print paper in an order different from the order in which the sheets of paper appear in the print products to be output if the printing remaining amount is not less than the predetermined value.

16. A method for controlling an image processing system, the image processing system having a feeding unit configured to feed print paper to be used in print processing from multiple paper-storage units, the method comprising:

performing print processing for printing an image;

managing charging information, including a printing remaining amount for controlling an amount of printing that may be performed, which printing remaining amount can be adjusted according to the print processing;

slowing down a rate of print processing if the printing remaining amount indicated by the charging information is less than a predetermined value, and controlling the feeding unit to feed sheets of print paper from the paper-storage units in an order that is the same as an order in which the sheets of print paper appear in print products to be output if the printing remaining amount is less than the predetermined value, and controlling the feeding unit to feed sheets of print paper in an order different from the order in which the sheets of paper appear in the print products to be output if the printing remaining amount is not less than the predetermined value.

17. A method for controlling an image processing system connectable to a charging apparatus configured to manage charging information including a printing remaining amount for controlling an amount of printing that may be performed, which printing remaining amount can be adjusted according to print processing, the image processing system having a feeding unit configured to feed print paper to be used in print processing from multiple paper-storage units, the method comprising:

performing print processing for printing an image;

slowing down a rate of print processing if the printing remaining amount indicated by the charging information managed by the charging apparatus is less than a predetermined value, and controlling the feeding unit to feed sheets of print paper from the paper-storage units in an order that is the same as an order in which the sheets of print paper appear in print products to be output if the printing remaining amount is less than the predetermined value, and controlling the feeding unit to feed sheets of print paper in an order different from the order in which the sheets of paper appear in the print products to be output if the printing remaining amount is not less than the predetermined value.

18. A non-transitory computer-readable storage medium storing instructions for execution by an image-processing system, the image processing system having a feeding unit configured to feed print paper to be used in print processing from multiple paper-storage units, wherein execution of the instructions causes the image processing system to perform a method comprising:

performing print processing for printing an image;

managing charging information, including a printing remaining amount for controlling an amount of printing that may be performed, which printing remaining amount can be adjusted according to the print processing;

slowing down a rate of print processing if the printing remaining amount indicated by the charging information is less than a predetermined value, and controlling the feeding unit to feed sheets of print paper from the paper-storage units in an order that is the same as an order in which the sheets of print paper appear in print products to be output if the printing remaining amount is less than the predetermined value, and controlling the feeding unit to feed sheets of print paper in an order different from the order in which the sheets of paper appear in the print products to be output if the printing remaining amount is not less than the predetermined value.

19. A non-transitory computer-readable storage medium storing instructions for execution by an image processing system connectable to a charging apparatus configured to manage charging information including a printing remaining amount for controlling an amount of printing that may be performed, which printing remaining amount can be adjusted according to print processing, the image processing system having a feeding unit configured to feed print paper to be used in print processing from multiple paper-storage units, wherein execution of the instructions causes the image processing system to perform a method comprising:

performing print processing for printing an image;

slowing down a rate of print processing if the printing remaining amount indicated by the charging information managed by the charging apparatus is less than a predetermined value, and controlling the feeding unit to feed sheets of print paper from the paper-storage units in an order that is the same as an order in which the sheets of print paper appear in print products to be output if the printing remaining amount is less than the predetermined value, and controlling the feeding unit to feed sheets of print paper in an order different from the order in which the sheets of paper appear in the print products to be output if the printing remaining amount is not less than the predetermined value.

* * * * *